(12) United States Patent
Ryu et al.

(10) Patent No.: US 10,142,554 B2
(45) Date of Patent: Nov. 27, 2018

(54) ELECTRONIC DEVICE INCLUDING LIGHT-EMITTING ELEMENTS AND METHOD OF OPERATING ELECTRONIC DEVICE

(71) Applicant: SAMSUNG ELECTRONICS CO., LTD., Suwon-si (KR)

(72) Inventors: Jae-yeol Ryu, Moscow (RU); Jong-chul Choi, Suwon-si (KR); Mikhail Popov, Moscow (RU); Ivan Panchenko, Moscow (RU); Jae-hyoung Park, Yongin-si (KR); Hyun-seok Hong, Suwon-si (KR); Jong-tae Kim, Suwon-si (KR); Jin-sung Kim, Seoul (KR); Ju-hee Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/476,162

(22) Filed: Mar. 31, 2017

(65) Prior Publication Data
US 2018/0063403 A1 Mar. 1, 2018

(30) Foreign Application Priority Data

Aug. 24, 2016 (RU) .................................. 2016134528
Mar. 17, 2017 (KR) ........................ 10-2017-0033864

(51) Int. Cl.
*H04N 5/222* (2006.01)
*H04N 5/235* (2006.01)
(Continued)

(52) U.S. Cl.
CPC ............. *H04N 5/2354* (2013.01); *G06T 7/50* (2017.01); *G06T 7/70* (2017.01); *H04N 5/2256* (2013.01);
(Continued)

(58) Field of Classification Search
CPC ..................................................... H04N 5/2256
(Continued)

(56) References Cited

U.S. PATENT DOCUMENTS 5,528,333 A 6/1996 Lee
5,895,128 A 4/1999 Kishimoto et al.
(Continued)

FOREIGN PATENT DOCUMENTS

EP 1 706 081 B1 5/2009
JP 4416206 B2 2/2010
(Continued)

OTHER PUBLICATIONS

"Vision Aid", Nov. 12, 2014, 5 pages total, Samsung Display Co. Ltd., http://Blog.SamsungDisplay.com/804.
(Continued)

*Primary Examiner* — Anthony J Daniels
(74) *Attorney, Agent, or Firm* — Sughrue Mion, PLLC

(57) ABSTRACT

An electronic device and a method of operating the electronic device are provided. The electronic device includes an imaging device configured to obtain an image of a subject, a light source including light-emitting elements configured to emit light in different directions, and a controller configured to determine a position of the subject and a distance to the subject in the image, and control a luminance of the light-emitting elements based on the position of the subject and the distance to the subject.

18 Claims, 15 Drawing Sheets

(51) Int. Cl.
    *G06T 7/50*     (2017.01)
    *G06T 7/70*     (2017.01)
    *H04N 5/225*    (2006.01)
    *H04N 5/232*    (2006.01)
    *H04N 9/04*     (2006.01)
    *H05B 33/08*    (2006.01)
    *H05B 37/02*    (2006.01)

(52) U.S. Cl.
    CPC ......... *H04N 5/23212* (2013.01); *H04N 9/045* (2013.01); *H05B 33/0872* (2013.01); *H05B 37/0272* (2013.01); *G06T 2207/10028* (2013.01)

(58) Field of Classification Search
    USPC .................................................. 348/370, 371
    See application file for complete search history.

(56)         References Cited

U.S. PATENT DOCUMENTS

| 7,136,672 | B2 | 11/2006 | Kitano et al. |
| 7,706,674 | B2 | 4/2010 | Sugimoto et al. |
| 7,902,205 | B2 | 3/2011 | Xue et al. |
| 8,154,650 | B2 | 4/2012 | Tsai |
| 8,743,275 | B1 | 6/2014 | Han |
| 9,128,352 | B2 | 9/2015 | Jendbro et al. |
| 9,338,849 | B2* | 5/2016 | Logiudice .......... H05B 33/0845 |
| 2007/0126921 | A1* | 6/2007 | Gallagher ................ G06T 5/20 348/362 |
| 2008/0186475 | A1 | 8/2008 | Kawata et al. |
| 2009/0161337 | A1* | 6/2009 | Matsui .................. G03B 15/05 362/5 |
| 2010/0220208 | A1* | 9/2010 | Park ...................... G03B 13/36 348/222.1 |
| 2010/0253797 | A1 | 10/2010 | Arshavski et al. |
| 2010/0283870 | A1* | 11/2010 | Kleihorst ................ G03B 7/16 348/234 |
| 2011/0123183 | A1* | 5/2011 | Adelsberger ........... G03B 15/03 396/164 |
| 2014/0168463 | A1* | 6/2014 | Tamura .................. H04N 9/735 348/223.1 |
| 2014/0328539 | A1 | 11/2014 | Weng et al. |
| 2015/0227025 | A1 | 8/2015 | Park et al. |
| 2016/0109232 | A1* | 4/2016 | Shin ..................... H04N 5/2256 348/140 |
| 2016/0174313 | A1 | 6/2016 | Nakamura et al. |
| 2016/0309067 | A1* | 10/2016 | Johansson ................ G02B 3/14 |
| 2016/0352993 | A1* | 12/2016 | Gerasimow .......... H04N 5/2354 |

FOREIGN PATENT DOCUMENTS

| KR | 10-2010-0109828 A | 10/2010 |
| KR | 10-2015-0094934 A | 8/2015 |
| WO | 2004/062271 A1 | 7/2004 |

OTHER PUBLICATIONS

"CMYK color model", Wikipedia, Feb. 6, 2016, 5 pages total, https://en.wikipedia.org/w/index.php?title=CMYK_color_model&oldid=703601181.

International Search Report and Written Opinion, issued by International Searching Authority in corresponding International Application No. PCT/KR2017/002992, dated Jun. 22, 2017, (PCT/ISA/220, PCT/ISA/210 & PCT/ISA/237).

Communication dated Feb. 20, 2017, issued by the Federal Service for Intellectual Property in counterpart Russian Patent Application No. 2016134528.

* cited by examiner

FIG. 10
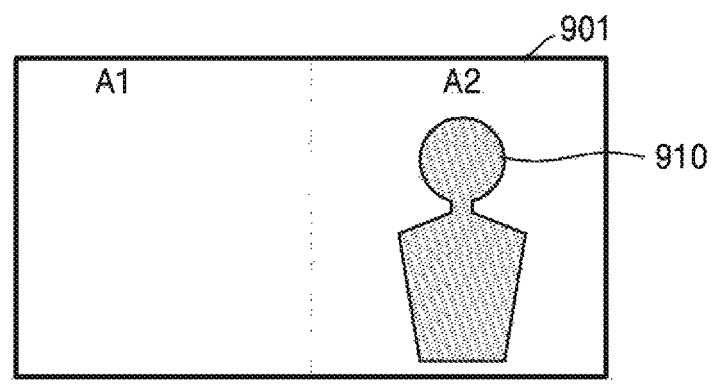
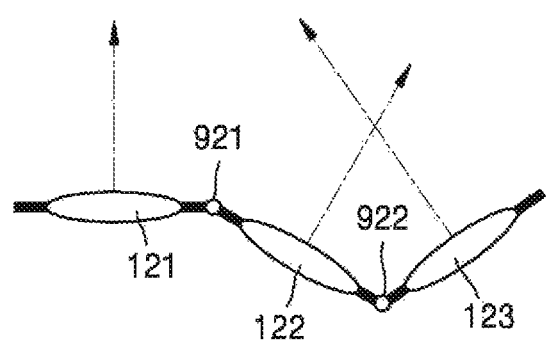

FIG. 12
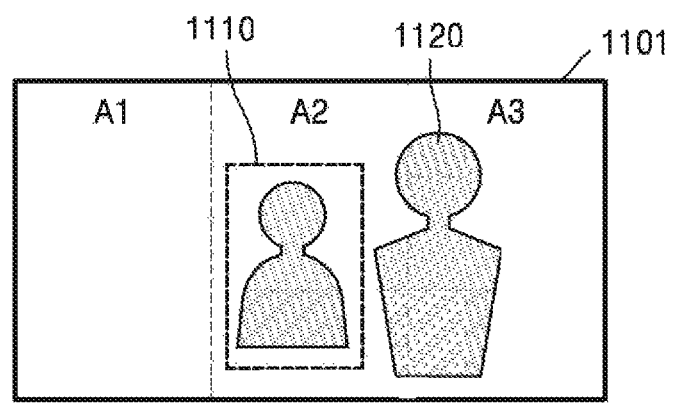
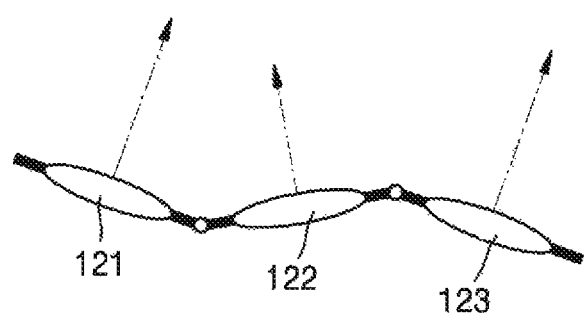

FIG. 14
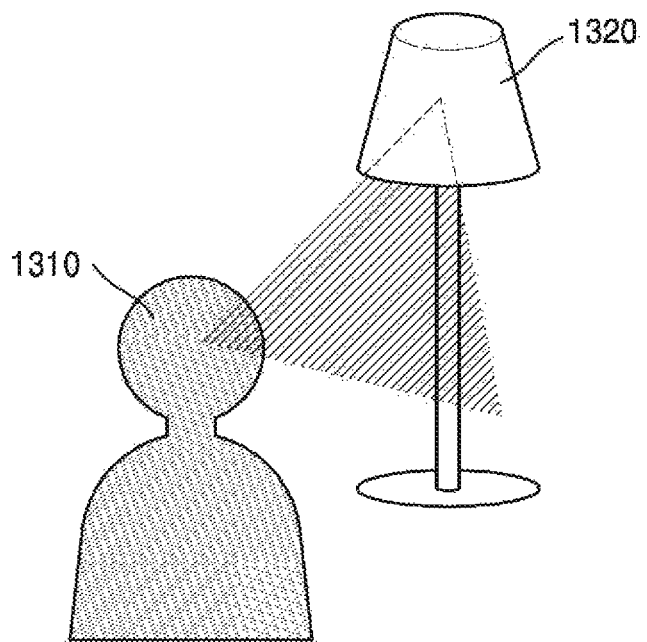
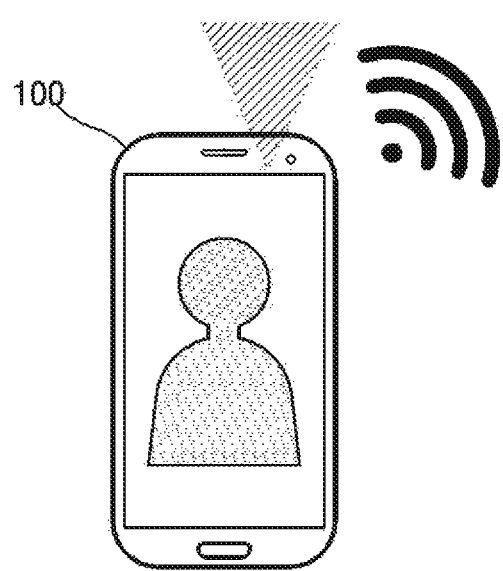

ELECTRONIC DEVICE INCLUDING LIGHT-EMITTING ELEMENTS AND METHOD OF OPERATING ELECTRONIC DEVICE

CROSS-REFERENCE TO RELATED APPLICATION

This application claims priority from Russian Patent Application No. 2016134528, filed on Aug. 24, 2016, in the Russian Federal Service for Intellectual Property, and priority from Korean Patent Application No. 10-2017-0033864, filed on Mar. 17, 2017, in the Korean Intellectual Property Office, the disclosures of which are incorporated herein by reference in their entireties.

BACKGROUND

1. Field

Apparatuses and methods consistent with exemplary embodiments relate to an electronic device including a plurality of light-emitting elements and a method of operating the electronic device.

2. Description of the Related Art

Semiconductor light-emitting elements such as light-emitting diodes (LEDs) include light-emitting materials, convert energy generated by electron-hole recombination into light, and emit the light. Recently, the LEDs are widely used as lighting devices, display devices, and light sources, the development thereof is accelerated, and the application range thereof is expanded also to a flash of a photographing device.

When the LEDs are applied to a flash of a photographing device, because the flash may be driven by less power than other light sources, the battery power may be effectively managed in the photographing device having the features of portable devices. Also, because the LEDs may be implemented in a form factor of smaller area than other light sources, they may be easily applied as a camera flash of a smart phone having a high hardware integration degree.

SUMMARY

Exemplary embodiments may address at least the above problems and/or disadvantages and other disadvantages not described above. Also, the exemplary embodiments are not required to overcome the disadvantages described above, and may not overcome any of the problems described above.

Exemplary embodiments provide an electronic device for controlling the luminance of a plurality of light-emitting elements based on the position of a subject and the distance to the subject, which are determined in an image acquired by the electronic device, and a method of operating the electronic device.

Exemplary embodiments provide an electronic device for controlling the color or color temperature of a plurality of light-emitting elements based on the position of a subject and the color or color temperature of the subject, which are determined in an image acquired by the electronic device, and a method of operating the electronic device.

According to an aspect of an exemplary embodiment, there is provided an electronic device including an imaging device configured to obtain an image of a subject, a light source including light-emitting elements configured to emit light in different directions, and a controller configured to determine a position of the subject and a distance to the subject in the image, and control a luminance of the light-emitting elements based on the position of the subject and the distance to the subject.

The light-emitting elements may be disposed on different planes.

The controller may be further configured to control a luminance of a light-emitting element configured to emit light to a region in which the subject is located, among the light-emitting elements, based on the distance to the subject.

The controller may be further configured to increase a luminance of a light-emitting element configured to emit light to a region in which the subject is located, among the light-emitting elements, in response to the distance to the subject increasing, and decrease the luminance of the light-emitting element configured to emit the light to the region, in response to the distance to the subject decreasing.

The controller may be further configured to determine the distance to the subject, using a depth map representing the distance to the subject.

The imaging device may be further configured to focus on distance measuring points to acquire a focal distance of each of the distance measuring points, and the controller may be further configured to determine the distance to the subject based on the focal distance of each of the distance measuring points.

The image may be divided into regions, and the controller may be further configured to determine a distance to each of the regions based on at least one among an area of the subject included in each of the regions, the distance to the subject, and whether the subject is a main subject, and control a luminance of each of the light-emitting elements configured to emit light to the respective regions, based on the distance to each of the regions.

The controller may be further configured to determine a color or a color temperature of the subject in the image, and control a color or a color temperature of the light-emitting elements based on the color or the color temperature of the subject.

The controller may be further configured to control a color or a color temperature of a light-emitting element configured to emit light to a region in which the subject is located, among the light-emitting elements, based on the color or the color temperature of the subject.

The controller may be further configured to control the color or the color temperature of the light-emitting element configured to emit the light to the region, to adjust a white balance of the region.

The electronic device may further include a driver configured to adjust the directions in which the light-emitting elements emit the light, based on the position of the subject and the distance to the subject.

The electronic device may further include a connection point disposed between at least two of the light-emitting elements, and the driver may be further configured to move the connection point to adjust positions of the at least two of the light-emitting elements and the directions in which the light-emitting elements emit the light.

The electronic device may further include a communication interface configured to transmit, to a lighting device located around the subject, a control signal for at least one among turning on and off the lighting device, adjusting a luminance of the lighting device, and adjusting a color or a color temperature of the lighting device.

According to an aspect of another exemplary embodiment, there is provided a method of operating an electronic device including light-emitting elements, the method including obtaining an image of a subject, determining a position of the subject and a distance to the subject in the image, and controlling a luminance of the light-emitting elements emitting light in different directions, based on the position of the subject and the distance to the subject.

The controlling may include controlling a luminance of a light-emitting element emitting light to a region in which the subject is located, among the light-emitting elements, based on the distance to the subject.

The controlling may include increasing a luminance of a light-emitting element emitting light to a region in which the subject is located, among the light-emitting elements, in response to the distance to the subject increasing, and decreasing the luminance of the light-emitting element emitting the light to the region, in response to the distance to the subject decreasing.

The determining may include determining the distance to the subject, using a depth map representing the distance to the subject.

The method may further include focusing on distance measuring points to acquire a focal distance of each of the distance measuring points, and the determining may include determining the distance to the subject based on the focal distance of each of the distance measuring points.

The image may be divided into regions, the determining may include determining a distance to each of the regions based on at least one among an area of the subject included in each of the regions, the distance to the subject, and whether the subject is a main subject, and the controlling may include controlling a luminance of each of the light-emitting elements configured to emit light to the respective regions, based on the distance to each of the regions.

The method may further include determining a color or a color temperature of the subject in the image, and controlling a color or a color temperature of the light-emitting elements based on the color or the color temperature of the subject.

The controlling the color or the color temperature of the light-emitting elements may include controlling a color or a color temperature of a light-emitting element emitting light to a region in which the subject is located, among the light-emitting elements, based on the color or the color temperature of the subject.

The controlling the color or the color temperature of the light-emitting elements may include controlling the color or the color temperature of the light-emitting element emitting the light to the region, to adjust a white balance of the region.

The method may further include adjusting the directions in which the light-emitting elements emit the light, based on the position of the subject and the distance to the subject.

The adjusting may include moving a connection point disposed between at least two of the light-emitting elements to adjust positions of the at least two of the light-emitting elements and the directions in which the light-emitting elements emit the light.

The method may further include transmitting, to a lighting device located around the subject, a control signal for at least one among turning on and off the lighting device, adjusting a luminance of the lighting device, and adjusting a color or a color temperature of the lighting device.

A non-transitory computer-readable storage medium may store a program including instructions to cause a computer to perform the method.

According to an aspect of another exemplary embodiment, there is provided an electronic device including an imaging device configured to obtain an image of a subject, a light source including light-emitting elements configured to emit light in different respective directions, and a controller configured to determine an image region in which the subject is located in the image, determine a distance from the imaging device to the subject in the image, and control, based on the distance, a luminance or a color of a light-emitting element configured to emit light to an actual region in which the subject is located, the actual region corresponding to the image region.

The controller may be further configured to receive a selection of the subject from subjects in the image, and control, based on the selection, the luminance or the color of the light-emitting element configured to emit light to the actual region in which the selected subject is located.

BRIEF DESCRIPTION OF THE DRAWINGS

The above and/or other aspects will be more apparent by describing exemplary embodiments with reference to the accompanying drawings, in which:

FIG. 10 is a diagram illustrating a method of adjusting a lighting direction of a light-emitting element by adjusting a direction and a position of the light-emitting element, by an electronic device, according to an exemplary embodiment;

FIG. 12 is a diagram illustrating a method of controlling a luminance and/or color or color temperature of a plurality of light-emitting elements based on a region of interest, by an electronic device, according to an exemplary embodiment;

FIG. 14 is a diagram illustrating a method of controlling an external lighting device, by an electronic device, according to an exemplary embodiment;

DETAILED DESCRIPTION

Figure 1:
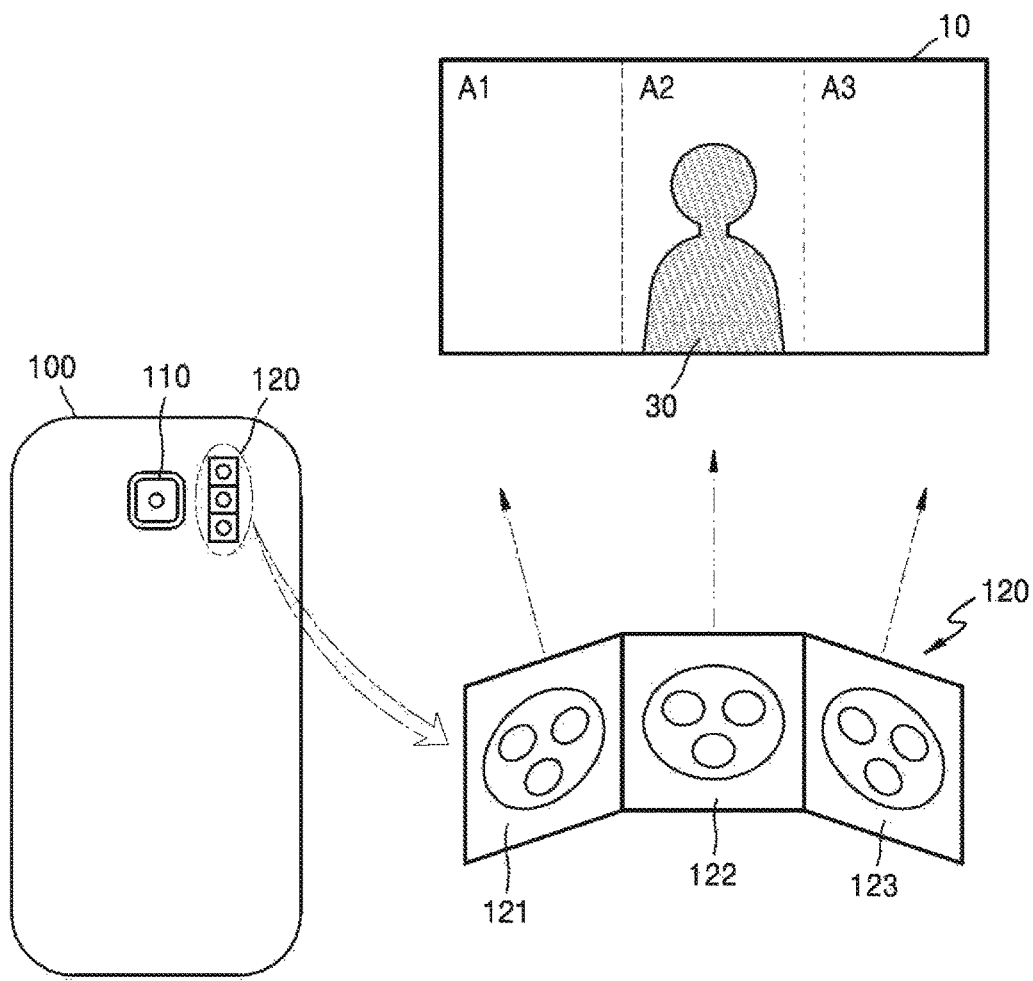
FIG. 1 is a diagram illustrating an electronic device according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating an electronic device according to an exemplary embodiment.

An electronic device 100 according to an exemplary embodiment may photograph at least one subject by including an imaging device 110 (e.g., a photographing device or a camera module), and may be implemented in various forms. For example, the electronic device 100 may be implemented as, but is not limited to, various electronic devices such as digital cameras, mobile phones, smart phones, notebook computers (laptop computers), desktop computers, tablet personal computers (PCs), e-book terminals, digital broadcasting terminals, personal digital assistants (PDAs), portable multimedia players (PMPs), navigation devices, MP3 players, camcorders, Internet protocol televisions (IPTVs), and digital televisions (DTVs). The electronic device 100 according to an exemplary embodiment may be a wearable device that may be worn by a user. The wearable device may include, but is not limited to, at least one among accessory-type devices (e.g., watches, rings, wristlets, anklets, necklaces, spectacles, or contact lenses), head-mounted devices (HMDs), textile or clothing-integrated devices (e.g., electronic clothing), body-attachable devices (e.g., skin pads), and bio-implantable devices (e.g., implantable circuits).

As used herein, the term "user" may refer to a person or a machine (system) controlling the function or operation of the electronic device 100, and may include a viewer, a manager, or an installer.

As used herein, the term "subject" may refer to an object to be photographed by using the electronic device 100, and may include various objects such as persons, scenes, and things.

Also, the electronic device 100 according to an exemplary embodiment includes a light source 120. The light source 120 according to an exemplary embodiment may be a camera flash device. The light source 120 may include a plurality of light-emitting elements. The light-emitting element may include a semiconductor element such as an LED that converts energy into light and emits the light. The light-emitting element may include a light-emitting element that emits a white light or a light of a color such as red, green, blue, or any combination thereof. Alternatively, the light-emitting element may include a light-emitting element that emits a light of a color such as cyan, magenta, yellow, or any combination thereof. Alternatively, the light-emitting element may include an infrared light-emitting element that emits an infrared light. However, exemplary embodiments are not limited thereto.

Also, the light-emitting elements according to an exemplary embodiment may emit lights of different luminances or different colors (lights of different color temperatures (wavelength bands)).

The electronic device 100 according to an exemplary embodiment drives the light-emitting elements included in the light source 120 and controls the imaging device 110 during the operation of the light-emitting elements to photograph at least one subject 30 and acquire an image 10.

The light-emitting elements according to an exemplary embodiment may light in different directions during the operation thereof. For example, as illustrated in FIG. 1, the light source 120 includes a first light-emitting element 121, a second light-emitting element 122, and a third light-emitting element 123 that are disposed on different planes to light in a first direction, a second direction, and a third direction, respectively. Although FIG. 1 illustrates that the light source 120 includes three light-emitting elements, exemplary embodiments are not limited thereto. However, hereinafter, for convenience of description, the case in which the light source 120 includes three light-emitting elements will be described as an example.

In this case, a region lighted by the first light-emitting element 121 corresponds to a first region A1 of the acquired image 10, and a region lighted by the second light-emitting element 122 corresponds to a second region A2 of the acquired image 10. Also, a region lighted by the third light-emitting element 123 corresponds to a third region A3 of the acquired image 10.

The electronic device 100 according to an exemplary embodiment may control the luminance and/or color or color temperature of each of the light-emitting elements based on the distance to a subject included in the region lighted by each of the light-emitting elements and the color or color temperature of the subject.

Figure 2:
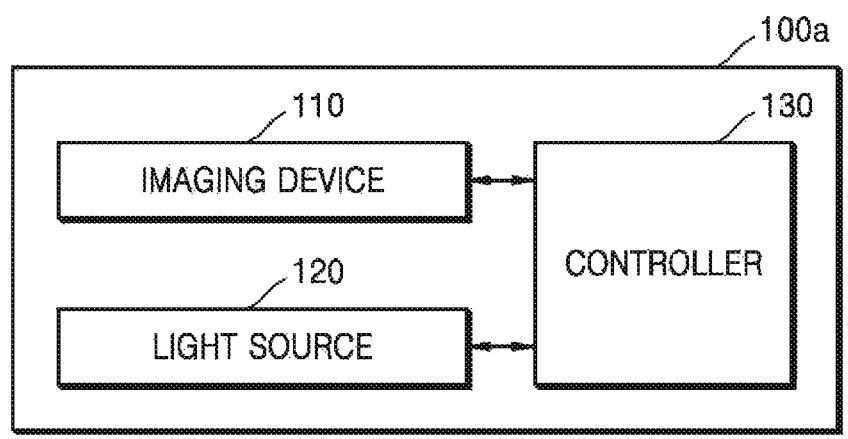
FIG. 2 is a block diagram illustrating a configuration of an electronic device according to an exemplary embodiment.

FIG. 2 is a block diagram illustrating a configuration of an electronic device according to an exemplary embodiment.

Referring to FIG. 2, an electronic device 100a according to an exemplary embodiment includes the imaging device 110, the light source 120, and a controller 130.

The imaging device 110 may include: an optical unit including one or more lenses; and an image sensor for acquiring an image by converting the light, which is reflected by the subject and flows in through the optical unit, into an electrical signal. Also, it may include an image sensor controller for controlling the image sensor.

The optical unit may include a plurality of groups of lenses. The position of the lens may be adjusted by a lens driver. The lens driver may adjust the position of the lens according to a control signal provided by the controller 130. The lens driver may adjust the position of the lens to adjust a focal distance and perform operations such as auto focusing, zoom change, and focus change.

Also, the optical unit may include a diaphragm. The opening/closing degree of the diaphragm may be adjusted by a diaphragm driver, and the diaphragm may adjust the amount of light flowing in the image sensor. The light passing out through the lens and the diaphragm may form a subject image on a light-receiving surface of the image sensor.

The image sensor may capture a two-dimensional (2D) or three-dimensional (3D) image of the subject. The image sensor may generate a subject image by using a photoelectric conversion element that responds according to the intensity of light reflected from an object. The image sensor may include, for example, a complementary metal-oxide semiconductor (CMOS) sensor, a charge-coupled device (CCD) sensor, and/or a complementary metal-oxide semiconductor image sensor (CIS). However, exemplary embodiments are not limited thereto.

Also, the sensitivity of the image sensor may be adjusted by the image sensor controller. The image sensor controller may control the image sensor according to a control signal that is automatically generated by an image signal that is input in real time, or according to a control signal that is manually input by a user's operation.

The light source 120 may include a plurality of light-emitting elements. The light-emitting element may include a semiconductor element such as an LED that converts energy into light and emits the light. The light-emitting element may include a light-emitting element that emits a white light, a light of a color such as red, green, blue, or any combination thereof. Alternatively, the light-emitting element may include a light-emitting element that emits a light of a color such as cyan, magenta, yellow, or any combination thereof. Alternatively, the light-emitting element may include an infrared light-emitting element that emits an infrared light. However, exemplary embodiments are not limited thereto, and the light source 120 may also include a laser light source in addition to an LED.

Also, the light-emitting elements may emit lights of different luminances or different colors.

The light-emitting elements according to an exemplary embodiment may be disposed on at least one plane, and may emit lights frontward with a diffusion angle. In this case, the diffusion angle may be modified. One or more light-emitting elements may be disposed on one plane. For example, only the white light-emitting element may be disposed on one plane, and the red, green, and blue light-emitting elements may be disposed together on one plane. Alternatively, the cyan, magenta, and yellow light-emitting elements may be disposed together on one plane. However, exemplary embodiments are not limited thereto.

The light-emitting elements may be disposed on different planes, and may light in different directions. The planes on which the light-emitting elements are disposed may have an angle other than a straight angle (180°) therebetween. For example, the angle between a first plane on which the first light-emitting element is disposed and a second plane on which the second light-emitting element is disposed may represent the angle between an extension line of the first plane and an extension line of the second plane. According to an exemplary embodiment, the planes on which the light-emitting elements may always have an angle other than a straight angle therebetween. Alternatively, the light-emitting elements may operate with an angle other than a straight angle therebetween only at the time when a shutter operates to capture an image, and the light-emitting elements may have a straight angle therebetween at the time when the shutter does not operate.

The controller 130 may control the overall operations of the electronic device 100. For example, the controller 130 may control the electronic device 100a by an internal program.

The controller 130 according to an exemplary embodiment may control the luminance of each of the light-emitting elements based on the distance to the subject included in the region lighted by each of the light-emitting elements. For example, the controller 130 may increase the luminance of the light-emitting element lighting the region in which the subject is located as the distance to the subject increases, and may decrease the luminance of the light-emitting element lighting the region in which the subject is located as the distance to the subject decreases.

Also, the controller 130 may control the color or color temperature of the light-emitting elements based on the color or color temperature of at least one subject in the image. For example, the electronic device 100a may control the color or color temperature of the light-emitting element lighting the region in which the subject is located, to adjust the white balance of the region in which the subject is located. The color temperature may refer to a numerical value that is used to represent the chromaticity of a light source having a blackbody radiation or a spectral distribution that is similar thereto.

According to an exemplary embodiment, the controller 130 may control the direction and position of each of the light-emitting elements based on the distance to the subject included in the region lighted by each of the light-emitting elements, or the color or color temperature of the region lighted by each of the light-emitting elements.

Figure 3:
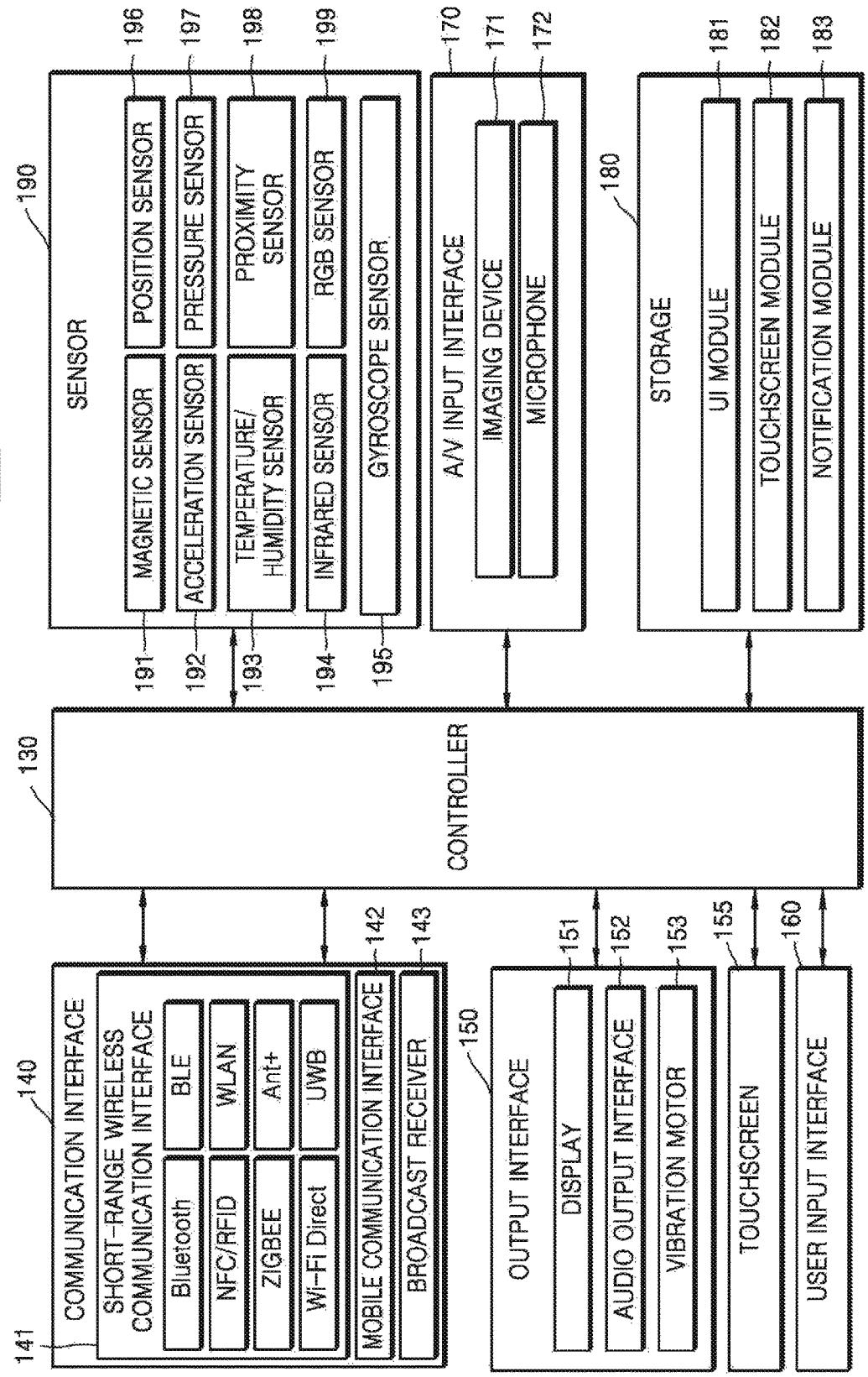
FIG. 3 is a block diagram illustrating a configuration of an electronic device according to an exemplary embodiment.

FIG. 3 is a block diagram illustrating a configuration of an electronic device according to an exemplary embodiment.

Referring to FIG. 3, an electronic device 100b may be an exemplary embodiment of the electronic device 100 illustrated in FIG. 1.

Referring to FIG. 3, the electronic device 100b according to an exemplary embodiment includes the controller 130, a communication interface 140, an output interface 150, a user interface 160, an audio/video (A/V) input interface 170, a storage 180, and a sensor 190.

An imaging device 171 (e.g., a photographing unit or a camera module) of FIG. 3 may include the imaging device 110 and the light source 120 of FIG. 2, and redundant descriptions about the same features of the imaging device 110, the light source 120, and the controller 130 as those in FIG. 2 will be omitted herein for conciseness.

The communication interface 140 may include one or more elements for communication between the electronic device 100 and an external device (e.g., a serer). For example, the communication interface 140 includes a short-range wireless communication interface 141, a mobile communication interface 142, and a broadcast receiver 143.

For example, the short-range wireless communication interface 141 includes, but is not limited to, a Bluetooth communication interface, a Bluetooth low energy (BLE) communication interface, a near field communication (NFC) or radio-frequency identification (RFID) communication interface, a wireless local area network (WLAN) or Wi-Fi communication interface, a ZigBee communication interface, an infrared data association (IrDA) communication interface, a Wi-Fi Direct (WFD) communication interface, an ultra wideband (UWB) communication interface, and/or an Ant+ communication interface.

The mobile communication interface 142 may transmit/receive wireless signals with at least one among a base station, an external terminal, and a server on a mobile communication network. Herein, the wireless signals may include voice call signals, video call signals, or various types of data for transmission and reception of text/multimedia messages.

The broadcast receiver 143 may receive broadcast signals and/or broadcast-related information from external devices through broadcast channels. The broadcast channels may include satellite channels and terrestrial channels. In exemplary embodiments, the electronic device 100b may not include the broadcast receiver 143.

The communication interface 140 may receive an image from the external device. Alternatively, the communication interface 140 may transmit an image, which is disposed on a display 151, and an image analysis request to the external server. Also, the communication interface 140 may analyze the transmitted image and receive the acquired image information from the external server.

The output interface 150 includes the display 151, an audio output interface 152, and a vibration motor 153 for outputting an audio signal or a video signal or a vibration signal. Because the display 151 has already been described with reference to FIG. 2, redundant descriptions thereof will be omitted herein for conciseness.

The audio output interface 152 may output audio data received from the communication interface 140 or stored in the storage 180. Also, the audio output interface 152 may output audio signals related to functions (e.g., call signal reception, message reception, and notification) performed by the electronic device 100b. The audio output interface 152 may include, for example, a speaker and a buzzer.

The vibration motor 153 may output a vibration signal. For example, the vibration motor 153 may output a vibration signal corresponding to an output of audio data or video data (e.g., a call signal reception sound and a message reception sound). Also, the vibration motor 153 may output a vibration signal when a touch is input to a touchscreen.

The controller 130 may control the overall operations of the electronic device 100. For example, the controller 130 may control the communication interface 140, the output interface 150, the user input interface 160, the sensor 190, and the A/V input interface 170 by executing the programs stored in the storage 180.

The user input interface 160 may refer to a unit through which the user inputs data for controlling the electronic device 100b. For example, the user input interface 160 may include, but is not limited to, a keypad, a dome switch, a touch pad (e.g., a capacitive overlay type, a resistive overlay type, an infrared beam type, a surface acoustic wave type, an integral strain gauge type, or a piezoelectric type), a jog wheel, and a jog switch.

A touchscreen 155 may include a touch panel and a display panel. The touchscreen 155 may be configured to detect not only a touch input position and a touch area but also a touch pressure. Also, the touchscreen 155 may be configured to detect not only a real touch but also a proximity touch.

Herein, the term "real touch" may refer to the real touch of a touch tool (e.g., an electronic pen or a finger) to the screen, and the term "proximity touch" may refer to the approach of a touch tool to the screen with a distance therebetween without a real touch thereto. Various sensors may be provided in or near the touchscreen 155 to sense a proximity touch or a touch to the touchscreen 155. An example of the sensor for sensing a touch to the touchscreen 155 may be a tactile sensor. The tactile sensor may refer to a sensor that senses a touch of an object in the degree of a human sense or more. The tactile sensor may sense a variety of information, such as the roughness of a touch surface, the hardness of a touch object, the temperature of a touch point, and the shape of a touch object.

Also, an example of the sensor for sensing a touch to the touchscreen 155 may be a proximity sensor 198. The proximity sensor 198 may refer to a sensor that detects the presence of an object approaching a detection surface or an object located in the proximity thereof without mechanical contact by using an electromagnetic field, an electromagnetic wave, or an infrared ray. Examples of the proximity sensor may include transmission type photoelectric sensors, direct reflection type photoelectric sensors, mirror reflection type photoelectric sensors, high frequency oscillation type proximity sensors, electrostatic capacity type proximity sensors, magnetic type proximity sensors, and infrared proximity sensors. Examples of the user's touch gesture may include tap, touch & hold, double tap, drag, panning, flick, drag & drop, and swipe.

The sensor 190 may include not only a sensor for sensing biometric information but also a sensor for sensing the state of the electronic device 100b or the peripheral state of the electronic device 100b. Also, the sensor 190 may transmit the information sensed by the sensor to the controller 130.

For example, the sensor 190 includes, but is not limited to, at least one among a magnetic sensor 191, an acceleration sensor 192, a temperature/humidity sensor 193, an infrared sensor 194, a gyroscope sensor 195, a position sensor (e.g., a global positioning system (GPS) sensor) 196, a pressure sensor 197, the proximity sensor 198, and a red, green, blue (RGB) sensor (illuminance sensor) 199. Because those of ordinary skill in the art may intuitively infer the respective functions of the sensors from the respective names thereof, detailed descriptions thereof will be omitted for conciseness.

The sensor 190 may sense, for example, a movement of the electronic device 100b, a biometric signal of the user of the electronic device 100b, and/or a touch signal input to the electronic device 100b.

The A/V input interface 170 includes, for example, the imaging device 171 and/or a microphone 172 for inputting video signals and/or audio signals. The imaging device 171 may obtain an image frame such as a still image or a moving image through an image sensor in a video call mode or a photographing mode. The image captured through the image sensor may be processed by the controller 130 or a separate image processor.

The image frame processed by the imaging device 171 may be stored in the storage 180, or may be transmitted to the outside thereof through the communication interface 140. Two or more imaging devices 171 may be provided according to the configurations of the electronic device 100b.

The microphone 172 may receive an input of an external audio signal and process the same into electrical audio data. For example, the microphone 172 may receive an audio signal from an external device or a speaker. The microphone 172 may use various noise cancellation algorithms for canceling a noise that may be generated during the input of an external audio signal.

The storage 180 may store a program for processing and control of the controller 130 and may store input/output data (e.g., application, content, time zone information of an external device, and address book).

The storage 180 may include at least one type of storage medium among flash memory type, hard disk type, multimedia card micro type, card type memory (e.g., SD and XD memories), random-access memory (RAM), static random-access memory (SRAM), read-only memory (ROM), electronically erasable programmable read-only memory (EEPROM), programmable read-only memory (PROM), magnetic memory, magnetic disk, and optical disk. Also, the electronic device 100 may operate a cloud server or a web storage for performing a storage function of the storage 180 on the Internet.

The programs stored in the storage 180 may be classified into a plurality of modules according to their functions and may be classified into, for example, a user interface (UI) module 181, a touchscreen module 182, and a notification module 183.

The UI module 181 may provide, for example, a specialized UI and graphical user interface (GUI) that interlock with the electronic device 100 for each application. The touchscreen module 182 may sense a touch gesture of the user on the touchscreen and transmit information about the touch gesture to the controller 130.

The touchscreen module 182 may recognize and analyze a touch code. The touchscreen module 182 may include separate hardware including a controller.

The notification module 183 may generate a notification signal. Examples of the event occurring in the electronic device 100b may include call signal reception, message reception, key signal input, and schedule notification. The notification module 183 may output a notification signal of a video signal type through the display 151, output a notification signal of an audio signal type through the audio output interface 152, and output a notification signal of a vibration signal type through the vibration motor 153.

Figure 4:
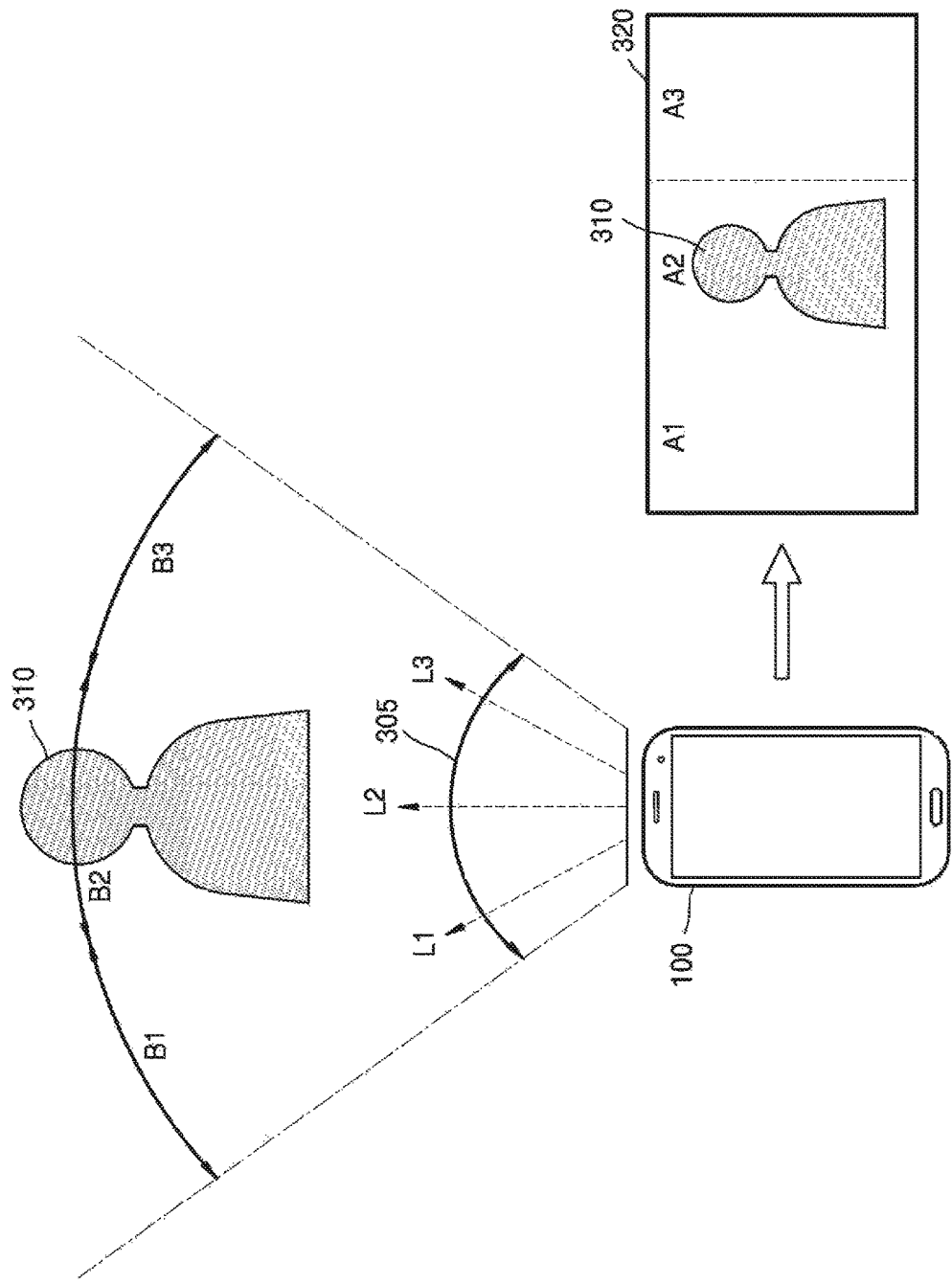
FIG. 4 is a diagram illustrating a method of acquiring an image by photographing a subject, by an electronic device, according to an exemplary embodiment.

FIG. 4 is a diagram illustrating a method of acquiring an image by photographing a subject, by an electronic device, according to an exemplary embodiment.

Referring to FIG. 4, the electronic device 100 according to an exemplary embodiment photographs at least one subject 310 by using the imaging device 110. When the electronic device 100 photographs the subject 310, a photographed region is determined according to a viewing angle (angle of view) 305 of the lens included in the imaging device 110. Accordingly, an entire image 320 captured and acquired by the electronic device 100 corresponds to the photographed region.

When the electronic device 100 photographs the subject 310, the light-emitting elements included in the light source 120 are operated to emit lights. The light-emitting elements emit lights in different directions to light at least one among a plurality of regions B1, B2, and B3 included in the photographed region.

For example, the photographing region is divided into a first photographing region B1 corresponding to a first region A1 of the captured image 320, a second photographing region B2 corresponding to a second region A2 of the image 320, and a third photographing region B3 corresponding to a third region A3 of the image 320. A light L1 emitted from the first light-emitting element may light the first photographing region B1, a light L2 emitted from the second light-emitting element may light the second photographing region B2, and a light L3 emitted from the third light-emitting element may light the third photographing region B3. However, exemplary embodiments are not limited thereto. For example, a portion of the light L1 emitted from the first light-emitting element may light the first photographing region B1, and the other portion thereof may light the second photographing region B2 or the third photographing region B3. Also, a portion of the light L2 emitted from the second light-emitting element may light the second photographing region B2, another portion thereof may light the first photographing region B1, and the other portion thereof may light the third photographing region B3.

The electronic device 100 according to an exemplary embodiment may extract a region where the subject 310 is located in the captured image 320. For example, the position of the subject in the captured image may refer to the position of the pixels corresponding to a subject region in the image. According to an exemplary embodiment, the electronic device 100 may divide the captured image into a plurality of regions and determine at least one region in which the subject is located. As illustrated in FIG. 4, when the captured image 320 is divided into three regions (the first region A1, the second region A2, and the third region A3), the second region A2 may be determined as the region in which the subject 310 is located.

The electronic device 100 according to an exemplary embodiment may determine a distance to the subject or a color or color temperature of the region in which the subject is located, and control the luminance and color or color temperature of the light-emitting elements based on the distance to the subject or the color or color temperature of the region in which the subject is located. This will be described below in more detail with reference to FIGS. 5 to 12.

Figure 5:
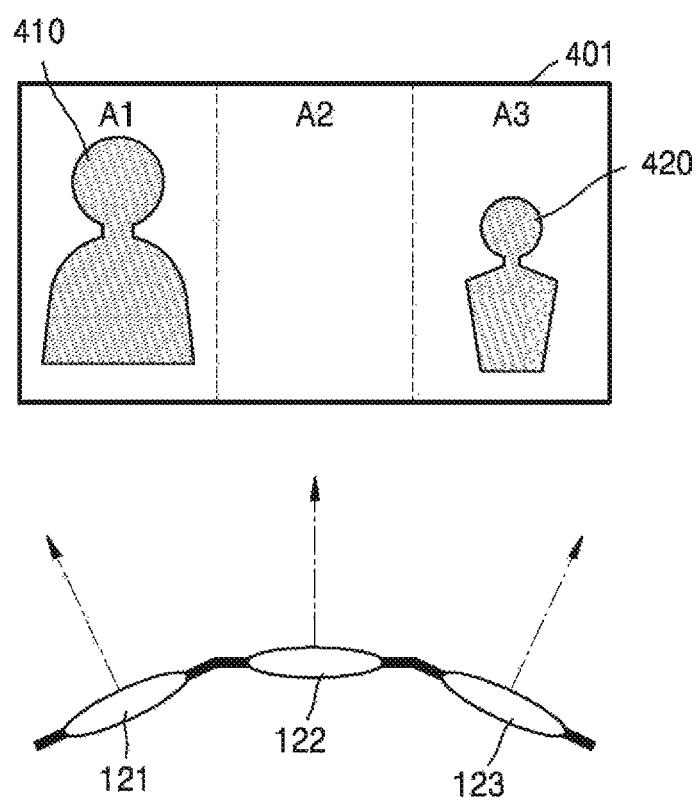
FIGS. 5, 6A, and 6B are diagrams illustrating a method of determining a luminance of a plurality of light-emitting elements based on a distance to a subject, by an electronic device, according to an exemplary embodiment.
Figure 6A:
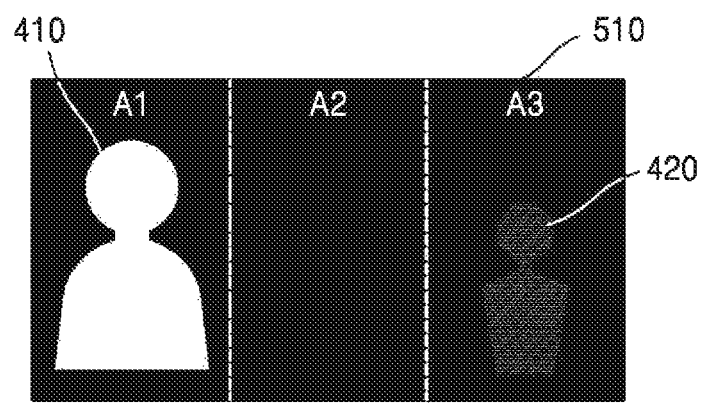
Figure 6B:
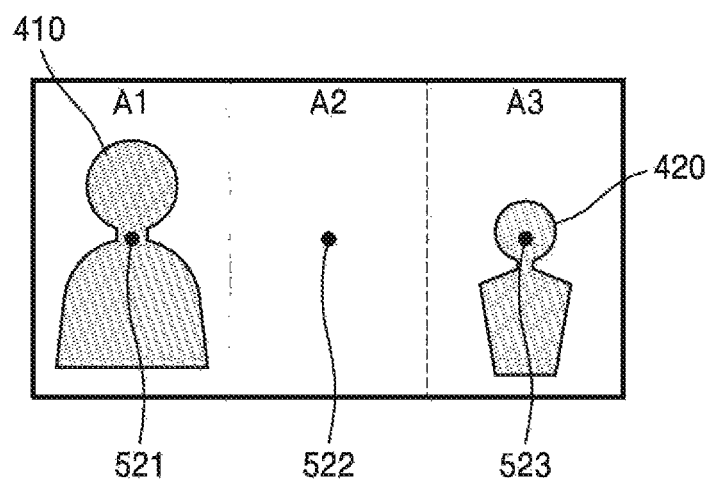

FIGS. 5, 6A, and 6B are diagrams illustrating a method of determining a luminance of a plurality of light-emitting elements based on a distance to a subject, by an electronic device, according to an exemplary embodiment.

Referring to FIG. 5, the electronic device 100 may extract a region where at least one subject is located in the image captured by the imaging device 110. For example, when a captured image 401 is divided into three regions A1, A2, and A3, the electronic device 100 may extract the first region A1 in which a first subject 410 is located and extract the third region A3 in which a second subject 420 is located.

Also, the electronic device 100 may acquire the distance to the first subject and the distance to the second subject. The distance to the subject may be, but is not limited to, the distance between the image sensor and the subject.

When the electronic device 100 includes a stereo camera or a depth camera (a time of flight (TOF) type or an IR structured light type), the electronic device 100 may acquire the distance to the subject by using the stereo camera or the depth camera. For example, as illustrated in FIG. 6A, the electronic device 100 acquires a depth image 510 by using the stereo camera or the depth camera. The depth image 510 may refer to an image in which a distance is represented in units of black and white. As for the pixel values included in the depth image 510, the pixel value may increase as the distance decreases, and the pixel value may decrease as the distance increases. For example, when the pixel values included in the depth image 510 are represented in the range of 0 to 255, a pixel region having a pixel value of 0 to 100 may be set as a long-distance range; a pixel region having a pixel value of 101 to 160 may be set as a medium-distance range; and a pixel region having a pixel value of 161 to 255 may be set as a short-distance range. However, exemplary embodiments are not limited thereto.

For example, by using the depth image of FIG. 6A, the electronic device 100 may determine the first region A1, in which the first subject 410 is located and is represented in units of white, as a short distance; the third region A3, in which the second subject 420 is located and is represented in units of approximately black, as a medium distance; and the second region A2 that is represented in units of black as a long distance.

Also, the electronic device 100 may acquire the distance to the subject by calculating the focal distance about the subject. For example, as illustrated in FIG. 6B, the electronic device 100 may perform auto-focusing (AF) (e.g., contrast AF or phase difference AF) on preset points (AF points) 521, 522, and 523 included in each region, and may calculate the focal distance about each region and acquire the distance corresponding to each region. In this case, as the number of preset points increases, the region-by-region distance may be more accurately acquired. Also, the electronic device 100 may classify the region-by-region distance into a short distance, a medium distance, and a long distance. However, exemplary embodiments are not limited thereto.

Referring again to FIG. 5, the electronic device 100 may determine the luminance of each of the light-emitting elements based on the distance to the subject. In this case, the electronic device 100 may calculate the luminance corresponding to the distance. For example, the electronic device 100 may determine which range among the preset distance ranges the distance to the subject is included in, and determine the luminance corresponding to the determined range as the luminance of the light-emitting element lighting the region in which the subject is located.

In this case, the distance ranges may include a short-distance range, a medium-distance range, and a long-distance range. However, exemplary embodiments are not limited thereto, and more distance ranges or fewer distance ranges may be included. Alternatively, instead of classifying the distance to the subject into distance ranges, the electronic device 100 may calculate the luminance corresponding to the distance by using, for example, a distance-luminance conversion equation.

Referring to FIG. 5, the distance to the first subject 410 may be determined as a short distance, the distance to the second region A2 including no subject may be determined as a long distance, and the distance to the second subject 420 may be determined as a medium distance. Also, the luminance corresponding to the short distance may be preset to 50%, the luminance corresponding to the medium distance may be preset to 70%, and the luminance corresponding to the long distance may be preset to 100%.

Accordingly, the electronic device 100 may control the luminance of the first light-emitting element 121 corresponding to the first region A1 to 50%, the luminance of the second light-emitting element 122 corresponding to the second region A2 to 100%, and the luminance of the third light-emitting element 123 corresponding to the third region A3 to 70%.

Figure 7:
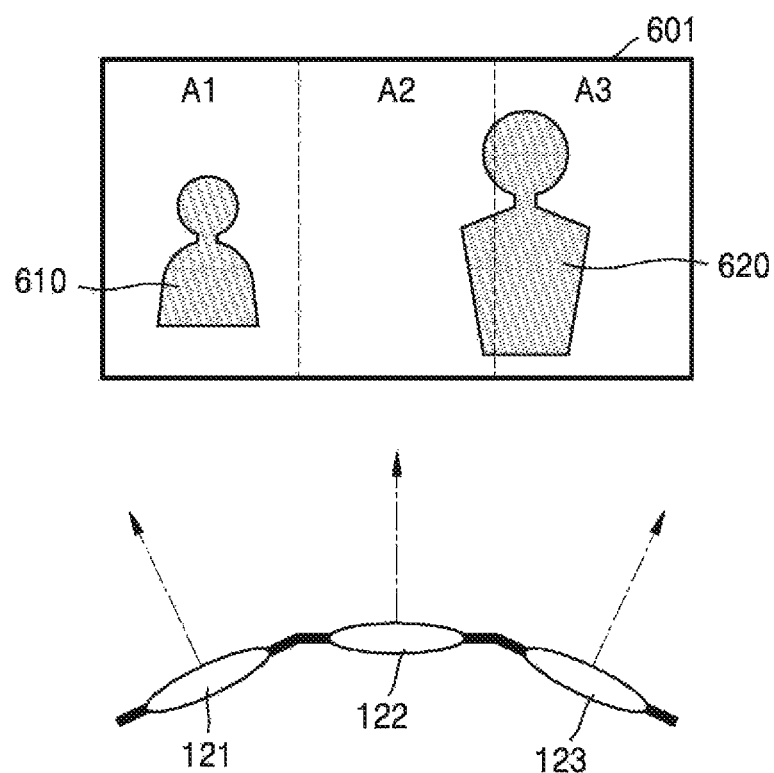
FIG. 7 is a diagram illustrating a method of determining a luminance of a plurality of light-emitting elements based on an area of a subject region in an image, by an electronic device, according to an exemplary embodiment.

FIG. 7 is a diagram illustrating a method of determining a luminance of a plurality of light-emitting elements based on an area of a subject region in an image, by an electronic device, according to an exemplary embodiment.

Referring to FIG. 7, the electronic device 100 may determine the region-by-region distance in consideration of the occupation area ratio of a subject region in each region of a captured image 601.

For example, a first subject 610 is included in the first region A1, a second subject 620 is included in the second region A2 and the third region A3, and the other portion (except the first subject 610 and the second subject 620) may be a background. In the case of the first region A1, the distance to the first subject 610 may correspond to a medium distance, and the occupation area ratio of the first subject region in the first region A1 may be 20%. Also, the other portion may be a background, the background may correspond to a long distance, and the occupation area ratio of the background may be 80%. Thus, the electronic device 100 may determine the distance of the first region A1 as a long distance. In the case of the second region A2, the distance to the second subject 620 may correspond to a short distance, and the occupation area ratio of the second subject region in the second region A2 may be 10%. Also, the other portion may be a background, the background may correspond to a long distance, and the occupation area ratio of the background may be 90%. Thus, the electronic device 100 may determine the distance of the second region A2 as a long distance. In the case of the third region A3, the distance to the second subject 620 may correspond to a short distance, and the occupation area ratio of the second subject region in the third region A3 may be 80%. Also, the other portion may be a background, the background may correspond to a long distance, and the occupation area ratio of the background may be 20%. Thus, the electronic device 100 may determine the distance of the third region A3 as a short distance.

Accordingly, the electronic device 100 may control the luminance of the first light-emitting element 121 corresponding to the first region A1 to 100%, the luminance of the second light-emitting element 122 corresponding to the second region A2 to 100%, and the luminance of the third light-emitting element 123 corresponding to the third region A3 to 50%. However, exemplary embodiments are not limited thereto.

The electronic device 100 may control the luminance of the light-emitting element in consideration of the region-by-region brightness state due to the peripheral external light source in addition to the distance. Also, in addition to controlling the relative luminance with respect to the maximum luminance, the electronic device 100 may set the standard luminance of the light-emitting element corresponding to a distance and control the light-emitting element such that the luminance may increase at a rate as the distance increases.

For example, in the case in which the luminance of the light-emitting element corresponding to the short distance is preset to A %, the luminance of the light-emitting element may be set to (a+A) % when the region corresponding to the light-emitting element is of the medium distance, and may be set to (b+A) % when the region corresponding to the light-emitting element is of the long distance.

Figure 8:
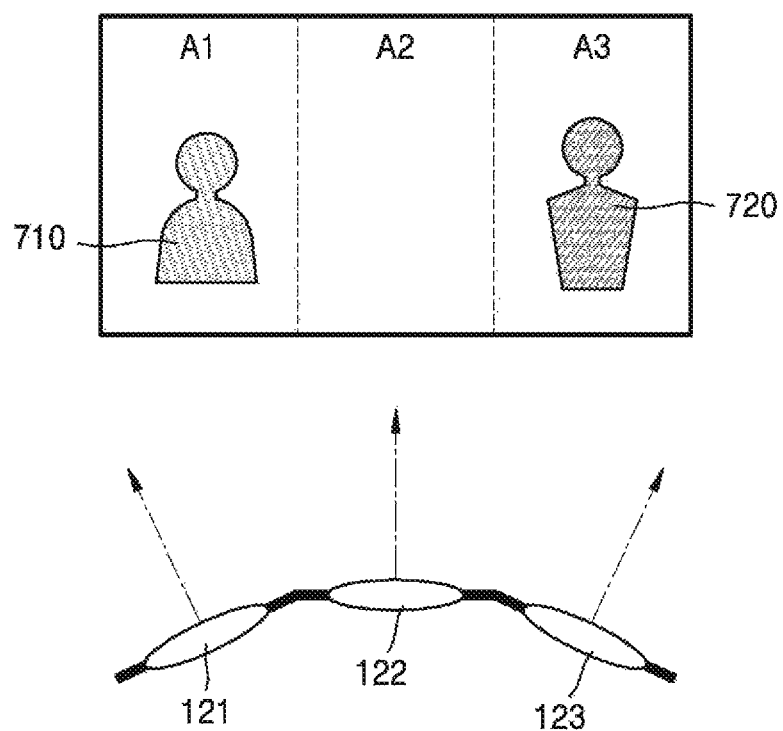
FIG. 8 is a diagram illustrating a method of determining a luminance of a plurality of light-emitting elements based on a distance to a main subject and an area of a subject region in an image, by an electronic device, according to an exemplary embodiment.

FIG. 8 is a diagram illustrating a method of determining a luminance of a plurality of light-emitting elements based on a distance to a main subject and an area of a subject region in an image, by an electronic device, according to an exemplary embodiment.

Referring to FIG. 8, the electronic device 100 may determine the region-by-region distance in consideration of the occupation area ratio of a subject region in each region of an image and whether a main subject is included in each region.

For example, a first subject 710 is included in the first region A1, a second subject 720 is included in the third region A3, and the second subject 720 may be a main subject. The main subject may include, for example, a focused subject, a person's face, or a subject that is selected by the user by using a touch input or a pen/button input. However, it is not limited thereto and may be determined in various ways.

In the case of the first region A1, the distance to the first subject 710 may correspond to a short distance, and the occupation area ratio of the first subject region in the first region A1 may be 30%. Because the other portion (the occupation area ratio 70%) may be a background and the background may correspond to a long distance, the electronic device 100 may determine the distance of the first region A1 as a long distance. Also, in the case of the second region A2, because the entire portion may be a background, the electronic device 100 may determine the distance of the second region A2 as a long distance. Also, in the case of the third region A3, because the second subject 720 may be included as a main subject, the electronic device 100 may determine the distance to the main subject as the distance of the third region A3. Thus, even when the occupation area ratio of the short-distance second subject region in the third region A3 may be 30% and the occupation area ratio of the long-distance background in the third region A3 may be 70%, the electronic device 100 may determine the short distance corresponding to the distance to the second subject 720 as the distance of the third region A3.

Accordingly, the electronic device 100 may control the luminance of the first light-emitting element 121 corresponding to the first region A1 to 100%, the luminance of the second light-emitting element 122 corresponding to the second region A2 to 100%, and the luminance of the third light-emitting element 123 corresponding to the third region A3 to 50%. However, exemplary embodiments are not limited thereto.

Alternatively, the electronic device 100 may determine both the first subject 710 and the second subject 720 as the main subject including a person's face and set both the first region A1 and the third region A3 as a short distance. Accordingly, the electronic device 100 may control the luminance of the first light-emitting element 121 and the third light-emitting element 123 to 50%, and the luminance of the second light-emitting element 122 to 100%.

Figure 9:
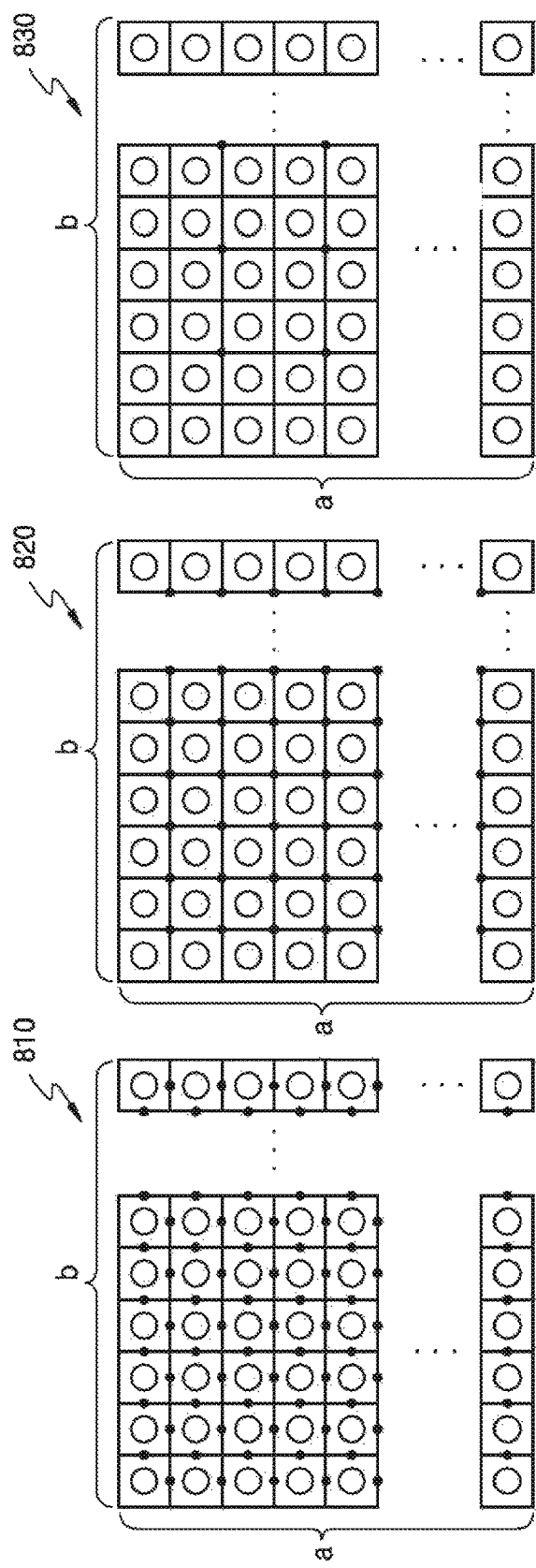
FIG. 9 is a diagram illustrating a light source according to an exemplary embodiment.

FIG. 9 is a diagram illustrating a light source according to an exemplary embodiment.

Referring to FIG. 9, the light source 120 according to an exemplary embodiment includes a light-emitting element array in which a plurality of light-emitting elements is arranged in the form of a×b. Also, the light source 120 according to an exemplary embodiment may further include a driver for adjusting the direction and position of the light-emitting elements. Also, the driver may include at least one actuator. In this case, two actuators may rotate one light-emitting element, which is included in the light-emitting element array, with respect to a horizontal axis and a vertical axis. Thus, when an actuator is connected to each of the light-emitting elements included in the a×b-type light-emitting element array, (2a×b) actuators may be used.

As illustrated in FIG. 9, the light-emitting element array according to an exemplary embodiment may be implemented in the form of at least one among a first array 810, a second array 820, and a third array 830 that include a connection point between the light-emitting elements.

Also, the driver according to an exemplary embodiment may adjust the direction or position of the light-emitting elements by moving the connection point in at least one axial direction.

For example, as in the first array 810, when a connection point is disposed at a side where two light-emitting elements contact with each other and an actuator is connected to each connection point, (2×a×b−a−b) actuators may be used. Also, as in the second array 820, when a connection point is disposed at a point where four light-emitting elements contact with each other and an actuator is connected to each connection point, (a×b−a−b+1) actuators may be used. Also, as in the third array 830, instead of disposing a connection point at all of the points where four light-emitting elements contact with each other, a connection point may be disposed at only some of the points where four light-emitting elements contact with each other. For example, a connection point may be disposed at a point where four 2×2-type sub-arrays each including four light-emitting elements contact with each other, or a connection point may be disposed at a point where four 3×3-type sub-arrays each including nine light-emitting elements contact with each other. Alternatively, a connection point may be disposed at a point where four 2×4-type sub-arrays contact with each other. However, the connection points are not limited thereto and may be disposed in various manners.

Thus, when an actuator is not connected to each of the light-emitting elements but a connection point is disposed between the light-emitting elements and an actuator is connected to the connection point, the number of actuators may decrease.

FIG. 10 is a diagram illustrating a method of adjusting a lighting direction of a light-emitting element by adjusting a direction and a position of the light-emitting element, by an electronic device, according to an exemplary embodiment.

Referring to FIG. 10, the electronic device 100 may determine each region-by-region distance of an image. For example, a captured image 901 is divided into two regions with respect to a subject 910. The subject 910 is not included in the first region A1, and the subject 910 is included in the second region A2. The electronic device 100 may determine the first region A1 not including the subject 910 as a long distance and may determine the distance of the second region A2 as a short distance based on the distance to the subject 910.

The electronic device 100 may determine the lighting direction of the light-emitting elements based on the region-by-region distance. Also, according to the determined lighting direction, the electronic device 100 may adjust the lighting direction by adjusting the angle of the plane on which the light-emitting elements are disposed, by moving frontward or backward the connection point disposed between the light-emitting elements.

For example, when the first region A1 is of a long distance, the second region A2 is of a short distance, and three light-emitting elements are provided, the electronic device 100 adjusts the lighting direction by moving a first connection point 921 between the first light-emitting element 121 and the second light-emitting element 122 and a second connection point 922 between the second light-emitting element 122 and the third light-emitting element 123 such that the first light-emitting element 121 and the third light-emitting element 123 corresponds to the first region A1 and the second light-emitting element 122 corresponds to the second region A2. However, exemplary embodiments are not limited thereto.

Also, the electronic device 100 may determine the luminance of each of the light-emitting elements in consideration of the number of light-emitting elements corresponding to the first region A1 and the number of light-emitting elements corresponding to the second region A2. For example, the luminance of the first light-emitting element 121 and the third light-emitting element 123 may be determined as 100%, and the luminance of the second light-emitting element 122 may be determined as 70%.

Figure 11:
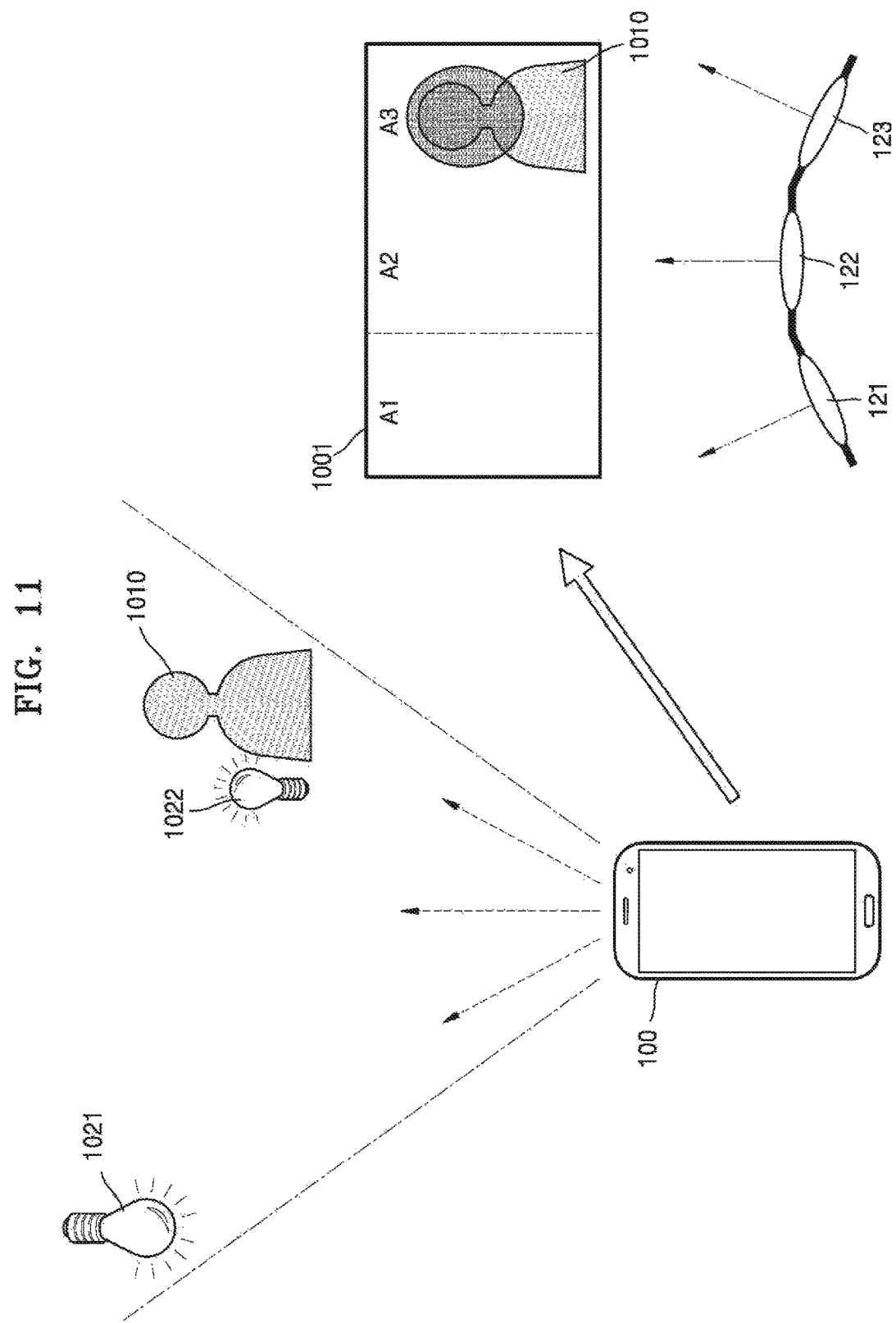
FIG. 11 is a diagram illustrating a method of determining a color or color temperature of a light-emitting element based on the color or color temperature of a subject, by an electronic device, according to an exemplary embodiment.

FIG. 11 is a diagram illustrating a method of determining a color or color temperature of a light-emitting element based on the color or color temperature of a subject, by an electronic device, according to an exemplary embodiment.

Referring to FIG. 11, when the electronic device 100 according to an exemplary embodiment photographs a subject 1010, the light emitted from external light sources 1021 and 1022 and the light emitted from the external light source and the light source 120 of the electronic device 100 and then reflected by the subject may be transmitted to the image sensor. The external light source may be a light source located outside the electronic device 100 and may be, for example, natural lighting such as solar light, or artificial lighting such as an incandescent lamp or a fluorescent lamp. The property of the light emitted from the external light source may be determined by the color or color temperature of the external light source, and the property of the light emitted from the external light source and then reflected by the subject may vary according to the color or color temperature of the external light source and/or the reflectivity and color property of the subject. Also, the property of the light emitted from the light source 120 of the electronic device 100 and then reflected by the subject may vary according to the color or color temperature of the light emitted from the light source and/or the reflectivity and color property of the subject.

For example, as illustrated in FIG. 11, the colors or color temperatures of the respective regions included in an image 1001 captured by the first external light source 1021 and the second external light source 1022 may be different from each other. When the first external light source 1021 is yellow lighting and the second external light source 1022 is green lighting, a yellow color may appear throughout the first, second, and third regions A1, A2, and A3, and a green color may appear strongly in the subject 1010 included in the third region A3 due to the influence of the second external light source 1022.

The electronic device 100 according to an exemplary embodiment may extract the region-by-region color or color temperature from the image 1001 and adjust the color or color temperature of each of the light-emitting elements to adjust the white balance of each region.

For example, the electronic device 100 may adjust the overall white balance to correct the appearance of a yellow color throughout the captured image 1001. Also, the electronic device 100 may adjust the color or color temperature of the third light-emitting element 123 corresponding to the third region A3 to correct the strong appearance of a green color in the third region A3. When the third light-emitting element 123 includes a combination of the light sources emitting red, green, and blue lights, the electronic device 100 may determine the luminance of the red light source of the third light-emitting element 123 as 100%, the luminance of the green light source thereof as 20%, and the luminance of the blue light source thereof as 100%. However, exemplary embodiments are not limited thereto.

FIG. 12 is a diagram illustrating a method of controlling a luminance and/or color or color temperature of a plurality of light-emitting elements based on a region of interest (i.e., an interesting region), by an electronic device, according to an exemplary embodiment.

Referring to FIG. 12, the electronic device 100 may determine the luminance and color or color temperature of the light-emitting elements based on an interesting region among the regions included in the captured image.

For example, a captured image 1101 includes a first subject 1110 in the second region A2 and includes a second subject 1120 in the third region A3. The electronic device 100 may receive a user input for selecting the first subject 1110. In this case, the user input may include, for example, a touch input or a pen/button input. Also, the first subject 1110 may be selected based on the personal information identified by face recognition.

When the first subject 1110 is selected, the electronic device 100 may adjust the luminance and color or color temperature of the light-emitting elements with respect to the first subject 1110. For example, not only the first light-emitting element 121 but also the second light-emitting element 122 is controlled to light the second region A2 such that the first subject 1110 may be represented brighter than the second subject 1120. In this case, the lighting direction may be adjusted by moving at least one among the connection point between the first light-emitting element 121 and the second light-emitting element 122 and the connection point between the second light-emitting element 122 and the third light-emitting element 123. Also, the luminance of the first light-emitting element 121 and the second light-emitting element 122 may be controlled to be higher than the luminance of the third light-emitting element 123 such that the second region A2 may be represented brighter than the third region A3.

Also, the color and luminance of the light-emitting elements may be adjusted such that the first subject 1110 may be represented in a color. For example, the color or color temperature of the light-emitting elements corresponding to the second region A2 may be controlled such that the first subject 1110 having a first color (or a first color temperature) may be represented in a second color (or a second color temperature). However, exemplary embodiments are not limited thereto.

Figure 13:
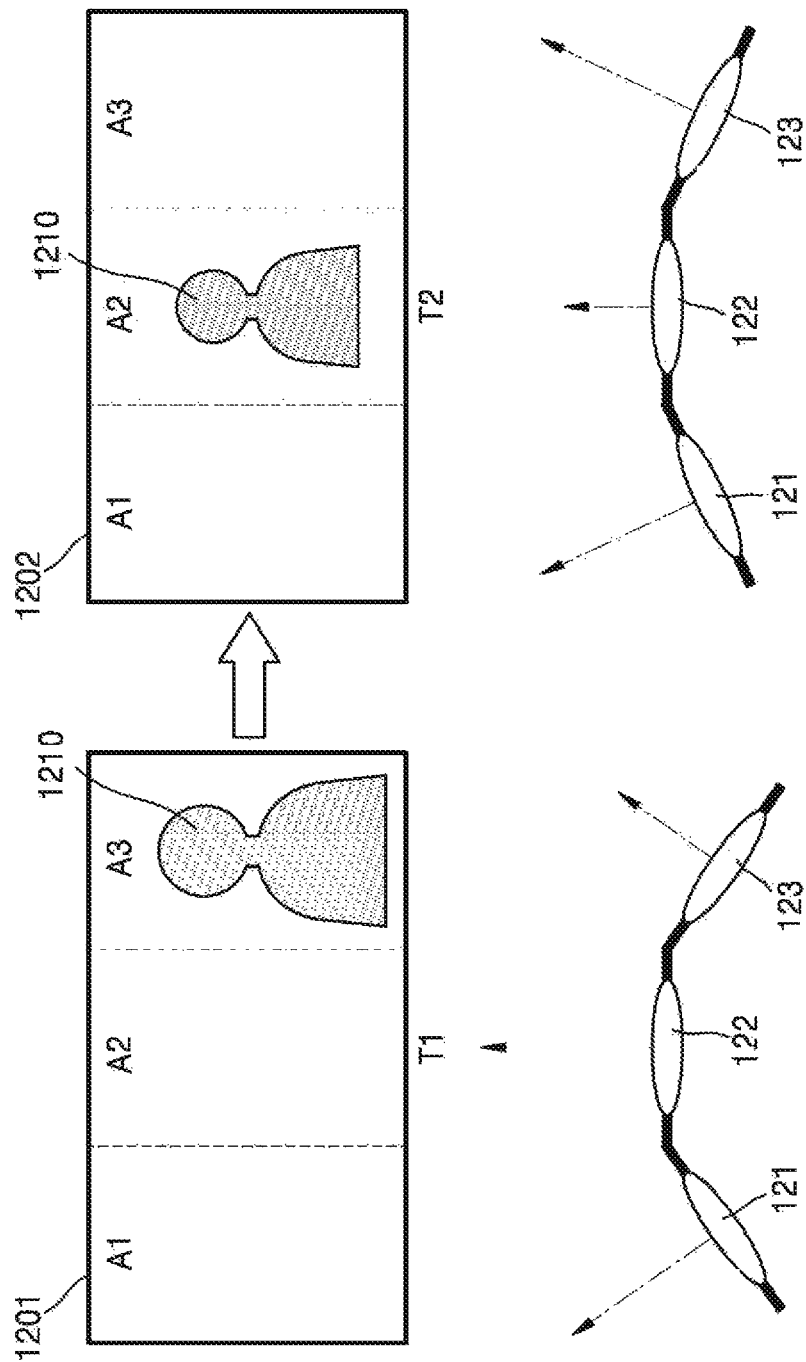
FIG. 13 is a diagram illustrating a method of controlling a luminance of a plurality of light-emitting elements by tracking a movement of a subject, by an electronic device, according to an exemplary embodiment.

FIG. 13 is a diagram illustrating a method of controlling a luminance of a plurality of light-emitting elements by tracking a movement of a subject, by an electronic device, according to an exemplary embodiment.

Referring to FIG. 13, a first image 1201 is captured at a first time T1, and a second image 1202 is captured at a second time T2. In the first image 1201, a subject 1210 is located in the third region A3, and the first region A1 and the second region A2 are a background including no subject.

The electronic device 100 may control the luminance of each of the light-emitting elements based on the distance to the subject 1210 located in the third region A3. For example, when the distance to the subject 1210 is a short distance, the luminance of the third light-emitting element 123 corresponding to the third region A3 may be controlled to 50%, and the luminance of the first light-emitting element 121 corresponding to the first region A1 and the second light-emitting element 122 corresponding to the second region A2 may be controlled to 100%. However, exemplary embodiments are not limited thereto.

When the subject 1210 is a moving subject, the electronic device 100 may track the movement of the subject 1210. For example, the electronic device 100 may perform a body-tracking AF. The body-tracking AF may refer to continuously focusing on a moving subject by tracking the moving subject. By performing the body-tracking AF, the electronic device 100 may track, for example, a change in the distance to the subject and a region to which the subject moves.

For example, when the subject 1210 moves to the left, the subject 1210 is located in the second region A2 in the second image 1202, and the electronic device 100 may track the region to which the subject 1210 moves. When the subject 1210 moves away from the electronic device 100, the electronic device 100 may track a change in the distance to the subject 1210.

The electronic device 100 may control the luminance of the light-emitting elements according to the position of the moved subject. For example, when the distance to the subject 1210 located in the second region A2 of the second image 1202 is a medium distance, the luminance of the second light-emitting element 122 corresponding to the second region A2 may be controlled to 70%, and the luminance of the first light-emitting element 121 corresponding to the first region A1 and the third light-emitting element 123 corresponding to the third region A3 may be controlled to 100%. However, exemplary embodiments are not limited thereto.

FIG. 14 is a diagram illustrating a method of controlling an external lighting device, by an electronic device, according to an exemplary embodiment.

According to an exemplary embodiment, when photographing a subject 1310, the electronic device 100 controls a lighting device 1320 located around the subject. Referring to FIG. 14, the lighting device 1320 located around the subject may be an Internet-of-Things (IoT) device, and may include a communication interface to communicate with the electronic device 100. Also, the lighting device 1320 may interlock with the electronic device 100. Also, the lighting device 1320 may include at least one light source to light the subject 1310. The lighting device 1320 according to an exemplary embodiment may include, for example, a stand lamp, a bulb, a vehicle light device, or a flash device. However, exemplary embodiments are not limited thereto.

The electronic device 100 may acquire information about the light source included in the lighting device 1320, from the lighting device 1320. In this case, the information about the light source may include, for example, the luminance range of the light source, the size of the light source, the color or color temperature of the light source, the type of the light source, and/or the lighting direction of the light source.

Also, the electronic device 100 may receive the position information of the lighting device 1320 from the lighting device 1320 or detect the position of the lighting device 1320.

According to an exemplary embodiment, based on the position of the lighting device and the information about the light source included in the lighting device, the electronic device 100 may determine whether to use the lighting device 1320 in the process of photographing the subject 1320. That is, the electronic device 100 may determine whether to turn on the lighting device 1320.

According to an exemplary embodiment, the electronic device 100 may transmit a control command to the lighting device 1320 to turn on or off the lighting device 1320. Alternatively, the electronic device 100 may transmit a control command to the lighting device 1320 to adjust the luminance of the lighting device 1320 or adjust the color or color temperature, the luminance range, and/or the lighting direction thereof. However, exemplary embodiments are not limited thereto.

Figure 15:
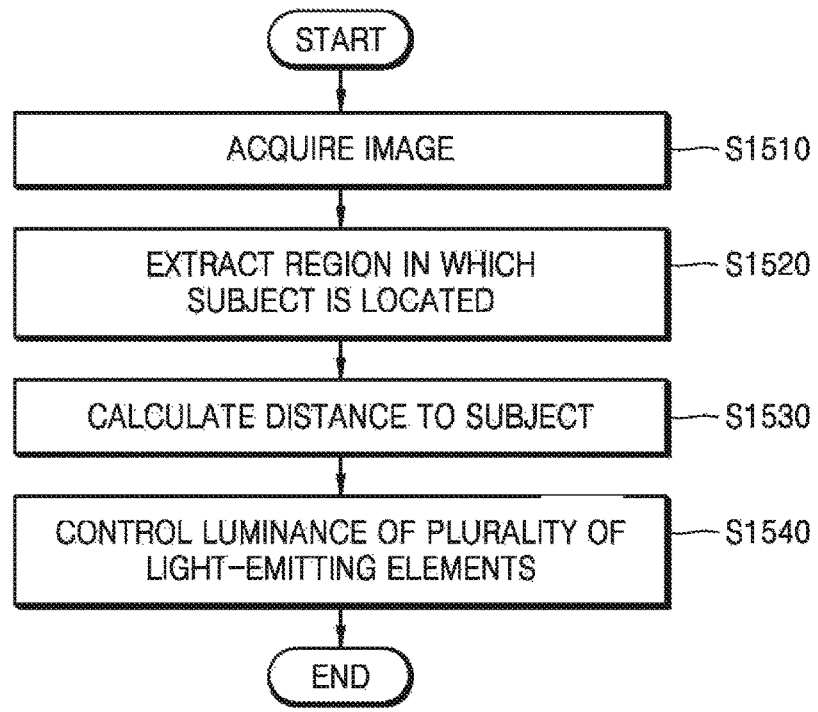
FIG. 15 is a flow diagram illustrating a method of operating an electronic device, according to an exemplary embodiment.

FIG. 15 is a flow diagram illustrating a method of operating an electronic device, according to an exemplary embodiment.

Referring to FIG. 15, the electronic device 100 acquires an image by photographing at least one subject (S1510).

For example, the electronic device 100 may acquire a preview image by photographing at least one subject. The preview image may be used to identify the photographing condition and the composition of a subject to be photographed.

The electronic device 100 extracts a region in which the subject is located from the image (S1520).

For example, the position of the subject in the captured image may refer to the position of the pixels corresponding to a subject region in the image. According to an exemplary embodiment, the electronic device 100 may divide the captured image into a plurality of regions and determine at least one region in which the subject is located.

The electronic device 100 calculates the distance to the subject (S1530).

The distance to the subject may be, but is not limited to, the distance between the image sensor and the subject. When the electronic device 100 includes a stereo camera or a depth camera (a TOF type or an IR structured light type), the electronic device 100 may acquire the distance to the subject by using the stereo camera or the depth camera. Alternatively, the electronic device 100 may acquire the distance to the subject by calculating the focal distance about the subject.

The electronic device 100 controls the luminance of the plurality of light-emitting elements based on the distance to the subject (S1540).

In this case, the electronic device 100 may calculate the luminance corresponding to the distance. For example, the electronic device 100 may determine which range among the preset distance ranges the distance to the subject is included in, and determine the luminance corresponding to the determined range as the luminance of the light-emitting element lighting the region in which the subject is located. Alternatively, instead of classifying the distance to the subject into distance ranges, the electronic device 100 may calculate the luminance corresponding to the distance by using, for example, a distance-luminance conversion equation.

The electronic device 100 may increase the luminance of the light-emitting element lighting the region in which the subject is located as the distance to the subject increases, and may decrease the luminance of the light-emitting element lighting the region in which the subject is located as the distance to the subject decreases. However, exemplary embodiments are not limited thereto.

Figure 16:
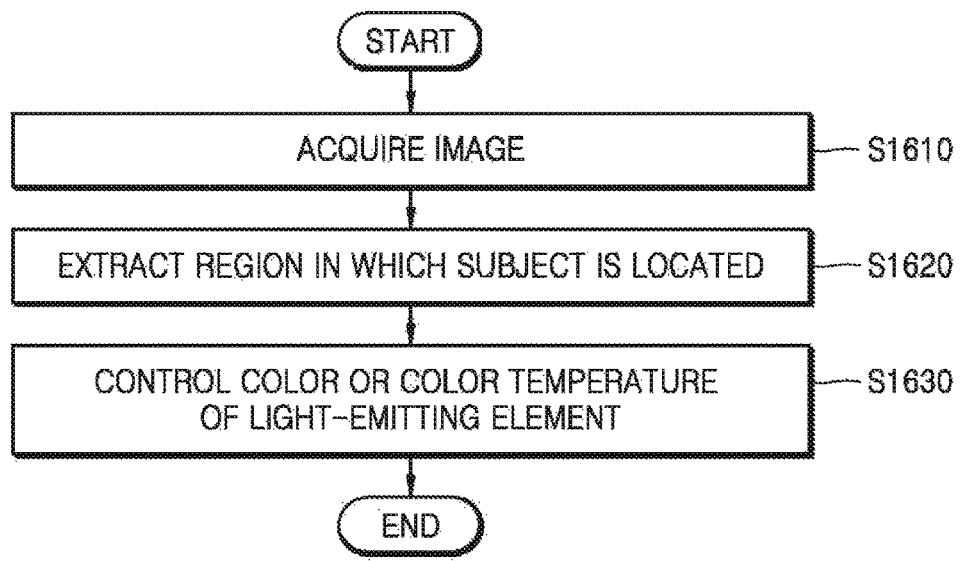
FIG. 16 is a flow diagram illustrating a method of operating an electronic device, according to an exemplary embodiment.

FIG. 16 is a flow diagram illustrating a method of operating an electronic device, according to an exemplary embodiment.

Referring to FIG. 16, the electronic device 100 acquires an image (S1610), and extracts a region in which a subject is located from the image (S1620).

Because operations S1610 and S1620 of FIG. 16 correspond respectively to operations S1510 and S1520 of FIG. 15, redundant descriptions thereof will be omitted for conciseness.

The electronic device 100 controls the color or color temperature of the light-emitting element lighting the region in which the subject is located, among the light-emitting elements (S1630).

When the electronic device 100 photographs the subject, the light emitted from external light source and the light emitted from the external light source and the light source 120 of the electronic device 100 and then reflected by the subject may be transmitted to the image sensor. The property of the light emitted from the external light source may be determined by the color or color temperature of the external light source, and the property of the light emitted from the external light source and then reflected by the subject may vary according to the color or color temperature of the external light source and/or the reflectivity and color property of the subject. Also, the property of the light emitted from the light source 120 of the electronic device 100 and then reflected by the subject may vary according to the color or color temperature of the light emitted from the light source and/or the reflectivity and color property of the subject.

Thus, the color or color temperature of the light-emitting element lighting the region in which the subject is located may be controlled to naturally represent the color of the subject, which is actually recognized by the user's eyes, in the captured image (or to adjust the white balance of the subject).

According to the above exemplary embodiments, an image having a substantially uniform brightness may be acquired by irradiating a weak light to a close subject and a strong light to a distant background in the process of photographing at least one object.

Also, in the image captured by complex lighting, a color distortion may be substantially prevented by adjusting the color or color temperature on a region-by-region basis.

Also, in the captured image, the color or color temperature of an interesting region may be partially adjusted while substantially maintaining the uniform color or color temperature.

In addition, the exemplary embodiments may also be implemented through computer-readable code and/or instructions on a medium, e.g., a computer-readable medium, to control at least one processing element to implement any of the above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device comprising:
    an imaging device configured to obtain an image of a subject;
    a light source comprising a plurality of light-emitting elements that comprises:
        a first light-emitting element configured to emit a first light in a first direction;
        a second light-emitting element configured to emit a second light in a second direction; and
        a third light-emitting element configured to emit a third light in a third direction; and
    a controller configured to:
        determine a distance to the subject, in the image;
        control a luminance of each of the plurality of light-emitting elements, based on the distance to the subject;
        divide the image into a first region in which the subject is not included and a second region in which the subject is included;
        control the first direction of the first light-emitting element and the third direction of the third light-emitting element to correspond to the first region; and
        control the second direction of the second light-emitting element to correspond to the second region,
    wherein the controller is further configured to control the first direction, the second direction, and the third direction by adjusting angles between planes on which the first light-emitting element, the second light-emitting element, and the third light-emitting element are respectively disposed.

2. The electronic device of claim 1, wherein the plurality of light-emitting elements is disposed on different planes.

3. The electronic device of claim 1, wherein the controller is further configured to:
    increase the luminance of the second light-emitting element configured to emit the second light in the second direction corresponding to the second region in which the subject is included, in response to the distance to the subject being determined to increase; and
    decrease the luminance of the second light-emitting element configured to emit the second light in the second direction corresponding to the second region, in response to the distance to the subject being determined to decrease.

4. The electronic device of claim 1, wherein the controller is further configured to determine the distance to the subject, using a depth map representing the distance to the subject.

5. The electronic device of claim 1, wherein the imaging device is further configured to focus on distance measuring points to acquire a focal distance of each of the distance measuring points, and
    the controller is further configured to determine the distance to the subject, based on the focal distance of each of the distance measuring points.

6. The electronic device of claim 1, wherein the controller is further configured to:
    divide the image into a plurality of regions;
    determine a distance to each of the plurality of regions, based on any one or any combination of an area of the subject included in each of the plurality of regions, the distance to the subject, and whether the subject is a main subject; and
    control the luminance of each of the plurality of light-emitting elements configured to emit the first light, the second light, and the third light respectively to the plurality of regions, based on the distance to each of the plurality of regions.

7. The electronic device of claim 1, wherein the controller is further configured to:
    determine a subject color or a subject color temperature of the subject in the image; and
    control an emitted color or an emitted color temperature of each of the plurality of light-emitting elements, based on the subject color or the subject color temperature.

8. The electronic device of claim 7, wherein the controller is further configured to control the emitted color or the emitted color temperature of the second light-emitting element configured to emit the second light in the second direction corresponding to the second region in which the subject is included, based on the subject color or the subject color temperature.

9. The electronic device of claim 8, wherein the controller is further configured to control the emitted color or the emitted color temperature of the second light-emitting element configured to emit the second light in the second direction corresponding to the second region, to adjust a white balance of the second region.

10. A method of operating an electronic device comprising a plurality of light-emitting elements that comprises a first light-emitting element configured to emit a first light in a first direction, a second light-emitting element configured to emit a second light in a second direction, and a third light-emitting element configured to emit a third light in a third direction, the method comprising:
- obtaining an image of a subject;
- determining a distance to the subject, in the image;
- controlling a luminance of each of the plurality of light-emitting elements, based on the distance to the subject;
- dividing the image into a first region in which the subject is not included and a second region in which the subject is included;
- controlling the first direction of the first light-emitting element and the third direction of the third light-emitting element to correspond to the first region; and
- controlling the second direction of the second light-emitting element to correspond to the second region,
- wherein the controlling the first direction, the second direction, and the third direction comprises adjusting angles between planes on which the first light-emitting element, the second light-emitting element, and the third light-emitting element are respectively disposed.

11. The method of claim 10, wherein the controlling the luminance comprises:
- increasing the luminance of the second light-emitting element configured to emit the second light in the second direction corresponding to the second region in which the subject is included, in response to the distance to the subject being determined to increase; and
- decreasing the luminance of the second light-emitting element configured to emit the second light in the second direction corresponding to the second region, in response to the distance to the subject being determined to decrease.

12. The method of claim 10, wherein the determining comprises determining the distance to the subject, using a depth map representing the distance to the subject.

13. The method of claim 10, further comprising focusing on distance measuring points to acquire a focal distance of each of the distance measuring points,
wherein the determining comprises determining the distance to the subject, based on the focal distance of each of the distance measuring points.

14. The method of claim 10, further comprising:
- dividing the image into a plurality of regions;
- determining a distance to each of the plurality of regions, based on any one or any combination of an area of the subject included in each of the plurality of regions, the distance to the subject, and whether the subject is a main subject; and
- controlling the luminance of each of the plurality of light-emitting elements configured to emit the first light, the second light, and the third light respectively to the plurality of regions, based on the distance to each of the plurality of regions.

15. The method of claim 10, further comprising:
- determining a subject color or a subject color temperature of the subject in the image; and
- controlling an emitted color or an emitted color temperature of each of the plurality of light-emitting elements, based on the subject color or the subject color temperature.

16. The method of claim 15, wherein the controlling the emitted color or the emitted color temperature comprises controlling the emitted color or the emitted color temperature of the second light-emitting element configured to emit the second light in the second direction corresponding to the second region in which the subject is included, based on the subject color or the subject color temperature.

17. The method of claim 15, wherein the controlling the emitted color or the emitted color temperature comprises controlling the emitted color or the emitted color temperature of the second light-emitting element configured to emit the second light in the second direction corresponding to the second region, to adjust a white balance of the second region.

18. A non-transitory computer-readable storage medium storing a program comprising instructions to cause a computer to perform the method of claim 10.

* * * * *